(12) United States Patent
Kuo

(10) Patent No.: US 10,642,078 B2
(45) Date of Patent: May 5, 2020

(54) MAGNETOCHROMATIC DISPLAY

(71) Applicant: Au Optronics Corporation, Hsinchu (TW)

(72) Inventor: Chih-Che Kuo, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 17 days.

(21) Appl. No.: 16/018,079

(22) Filed: Jun. 26, 2018

(65) Prior Publication Data

US 2019/0227353 A1 Jul. 25, 2019

(30) Foreign Application Priority Data

Jan. 24, 2018 (TW) .............................. 107102536 A
Apr. 30, 2018 (TW) .............................. 107114626 A

(51) Int. Cl.

| G02F 1/09 | (2006.01) |
|---|---|
| G02F 1/00 | (2006.01) |
| G09G 3/34 | (2006.01) |
| H01F 27/32 | (2006.01) |
| G02B 5/22 | (2006.01) |
| H01F 27/24 | (2006.01) |
| H01F 5/00 | (2006.01) |

(52) U.S. Cl.
CPC .............. G02F 1/092 (2013.01); G02B 5/22 (2013.01); G02F 1/0036 (2013.01); G09G 3/3486 (2013.01); H01F 27/32 (2013.01); G09G 2300/0842 (2013.01); G09G 2300/0885 (2013.01); H01F 5/003 (2013.01); H01F 27/24 (2013.01)

(58) Field of Classification Search
CPC ......... G02F 1/092; G02F 1/0036; G02B 5/22; G09G 3/3486; G09G 2300/0842; G09G 2300/0885; H01F 27/32; H01F 5/003; H01F 27/24
See application file for complete search history.

(56) References Cited

U.S. PATENT DOCUMENTS

| 8,871,327 B2 | 10/2014 | Tsai |
| 8,889,234 B2 | 11/2014 | Kwon et al. |
| 9,891,776 B2 | 2/2018 | Zhou et al. |
| 2004/0150614 A1* | 8/2004 | Seo .......................... G02F 1/091 |
| | | 345/111 |

(Continued)

FOREIGN PATENT DOCUMENTS

| CN | 2653683 | 11/2004 |
| CN | 101436907 | 5/2009 |

(Continued)

OTHER PUBLICATIONS

André C. Arsenault et al., "Photonic-crystal full-colour displays", Nature Photonics, Aug. 2007, pp. 468-472.

(Continued)

*Primary Examiner* — Wen Huang
(74) *Attorney, Agent, or Firm* — JCIPRNET

(57) ABSTRACT

A magnetochromatic display including a first substrate, first magnetic field modulating devices, a second substrate, and a magnetochromatic layer is provided. The first substrate has first pixel regions. The first magnetic field modulating devices are respectively disposed on the first pixel regions. The second substrate is disposed opposite to the first substrate. The magnetochromatic layer is disposed between the first substrate and the second substrate.

14 Claims, 7 Drawing Sheets

(56) References Cited

U.S. PATENT DOCUMENTS

| | | | |
|---|---|---|---|
| 2007/0008439 A1 | 1/2007 | Nakayama et al. | |
| 2008/0084381 A1* | 4/2008 | Brewer | G04C 17/00 345/111 |
| 2008/0198440 A1* | 8/2008 | Cho | B82Y 20/00 359/280 |
| 2009/0052007 A1* | 2/2009 | Lee | G02F 1/091 359/283 |
| 2012/0148797 A1 | 6/2012 | Tsai | |
| 2013/0146788 A1 | 6/2013 | Yin et al. | |
| 2014/0109446 A1 | 4/2014 | Joo et al. | |
| 2015/0055061 A1 | 2/2015 | Johnston et al. | |
| 2016/0026301 A1 | 1/2016 | Zhou et al. | |

FOREIGN PATENT DOCUMENTS

| | | |
|---|---|---|
| CN | 102109584 | 6/2011 |
| CN | 102221679 | 10/2011 |
| CN | 102689538 | 9/2012 |
| CN | 102304263 | 5/2013 |
| CN | 103543899 | 1/2014 |
| CN | 104206009 | 12/2014 |
| CN | 103801241 | 12/2015 |
| CN | 106200200 | 12/2016 |
| TW | 201224579 | 6/2012 |

OTHER PUBLICATIONS

Zhenda Lu et al., "Colloidal nanoparticle clusters: Functional materials by design", The Royal Society of Chemistry, Jun. 2012, pp. 6874-6887.

Jianping GE et al., "Magnetically induced colloidal assembly into field-responsive photonic structures", The Royal Society of Chemistry, Jan. 2011, pp. 1-8.

\* cited by examiner

MAGNETOCHROMATIC DISPLAY

CROSS-REFERENCE TO RELATED APPLICATION

This application claims the priority benefit of Taiwan application serial no. 107102536, filed on Jan. 24, 2018, and Taiwan application serial no. 107114626, filed on Apr. 30, 2018. The entirety of the above-mentioned patent applications is hereby incorporated by reference herein and made a part of this specification.

BACKGROUND

Technical Field

The disclosure relates to a display, and more particularly, to a magnetochromatic display.

Description of Related Art

At present, reflective displays are mainly categorized into a conventional liquid crystal display (LCD), a cholesterol LCD, and an electrophoretic display. In the conventional LCD, the ambient light is polarized by a polarizer and is then adjusted by liquid crystal, and thus the amount of reflected light is insignificant. Besides, the color effects are achieved by a color filter in the conventional LCD; however, the color filter leads to the reduction of reflectivity. The reflectivity of the cholesterol LCD is greater than that of the conventional LCD but is still less than that of the electrophoretic display due to the configuration of the cholesterol LCD. In the electrophoretic display, the ambient light is directly reflected by electrophoretic particles, and the portion of the ambient light reflected by the electrophoretic particles need not pass through any polarizer and can be applied for displaying images, which leads to the high reflectivity of the electrophoretic display. Note that the electrophoretic particles are not magnetic particles. Besides, the electrophoretic display is mainly characterized by single-color display. If it is intended to achieve a full-color effect by the electrophoretic display, a color filter or color electrophoretic particles may be applied. However, the arrangement of the color filter in the electrophoretic display reduces the reflectivity; in case that the color electrophoretic particles are applied, the control of such an electrophoretic display becomes complicated. Moreover, the slow movement of the electrophoretic particles results in the excessive response time of the electrophoretic display.

SUMMARY

The disclosure provides a magnetochromatic display with good performance.

In an embodiment, a magnetochromatic display including a first substrate, a plurality of first magnetic field modulating devices, a second substrate, and a magnetochromatic layer is provided. The first substrate has a plurality of first pixel regions. The first magnetic field modulating devices are respectively disposed on the first pixel regions. The second substrate is disposed opposite to the first substrate. The magnetochromatic layer is disposed between the first substrate and the second substrate.

According to an embodiment, the magnetochromatic display further includes a first driver circuit layer. The first driver circuit layer is disposed on the first substrate and electrically connected to the first magnetic field modulating devices.

According to an embodiment, the first driver circuit layer includes a plurality of first thin film transistors (TFTs), a plurality of first scan lines, and a plurality of first data lines. The first TFTs are respectively disposed on the first pixel regions of the first substrate and electrically connected to the first magnetic field modulating devices. The first scan lines and the first data lines are disposed on the first substrate, intersected to each other, and electrically connected to the first TFTs, respectively.

According to an embodiment, the first driver circuit layer further includes a plurality of first thin film capacitors. The first thin film capacitors are disposed on the first substrate and electrically connected to the first TFTs.

According to an embodiment, the first magnetic field modulating devices include coils disposed on the first substrate.

According to an embodiment, the first magnetic field modulating devices further comprises a plurality of magnetic core materials. The coils respectively generate a plurality of magnetic fields, and the magnetic core materials are respectively arranged within the magnetic fields.

According to an embodiment, the magnetochromatic display further includes a first driver circuit layer. The first driver circuit layer is disposed on the first substrate and electrically connected to the coils through the magnetic core materials.

According to an embodiment, the first magnetic field modulating devices further include a magnetic storage material and an insulation layer. The magnetic storage material and the coils are at least partially overlapped. The insulation layer is disposed between the magnetic storage material and the coils.

According to an embodiment, the second substrate has a plurality of second pixel regions respectively overlapped with the first pixel regions. The magnetochromatic display further includes a plurality of second magnetic field modulating devices respectively disposed on the second pixel regions of the second substrate.

According to an embodiment, the magnetochromatic display further includes a second driver circuit layer. The second driver circuit layer is disposed on the second substrate and electrically connected to the second magnetic field modulating devices.

According to an embodiment, the second driver circuit layer includes a plurality of second TFTs, a plurality of second scan lines, and a plurality of second data lines. The second TFTs are respectively disposed on the second pixel regions of the second substrate and electrically connected to the second magnetic field modulating devices. The second scan lines and the second data lines are disposed on the second substrate, intersected to each other, and electrically connected to the second TFTs, respectively.

According to an embodiment, the second magnetic field modulating devices include a plurality of coils and the plurality of coils are transparent or semi-transmissive.

According to an embodiment, the magnetochromatic display further comprises a light absorbing layer. The light absorbing layer is disposed between the magnetochromatic layer and the first substrate.

In an embodiment, a driving method for driving a magnetochromatic display is provided. The magnetochromatic display includes a first substrate having a plurality of first pixel regions, a plurality of first magnetic field modulating devices respectively disposed on the first pixel regions, a second substrate disposed opposite to the first substrate, and a magnetochromatic layer disposed between the first substrate and the second substrate. The magnetochromatic layer has a plurality of magnetic particles located on any of the first pixel regions. The driving method comprises following steps. A magnetic field is generated by one of the first magnetic field modulating devices on the any of the plurality of first pixel regions, so that the magnetic particles are arranged in form of a cluster chain along a direction of the magnetic field. The cluster chain includes a plurality of clusters, and each of the plurality of clusters includes the magnetic particles gathering together. A period of the periodically arranged clusters of the cluster chain is controlled through adjusting a speed of an increase or decrease in the magnetic field and an intensity of the magnetic field, so as to control diffraction wavelength in and brightness shown by the first pixel regions.

According to an embodiment, the driving method further comprises controlling a length of the cluster chain through the intensity of the magnetic field, so as to determine the brightness displayed by the any of the first pixel regions.

In view of the above, the magnetochromatic display provided in one or more embodiments of the invention properly controls the magnetic field generated by the first magnetic field modulating devices, so as to allow a portion of the magnetochromatic layer on each first pixel region to reflect a light beam having a specified wavelength and a specified intensity. As such, the magnetochromatic display can display full-color images. Particularly, the magnetochromatic display can display colors because of the optical characteristics of the magnetochromatic layer. Since the magnetochromatic display achieves full colorization in no need of any color filter, the reflectivity of the magnetochromatic display is high. Besides, the mobility speed of the magnetic particles in the magnetochromatic layer is fast, the magnetochromatic display provided herein can have the advantage of short response time.

To make the above features and advantages provided in one or more of the embodiments of the invention more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Figure 1:
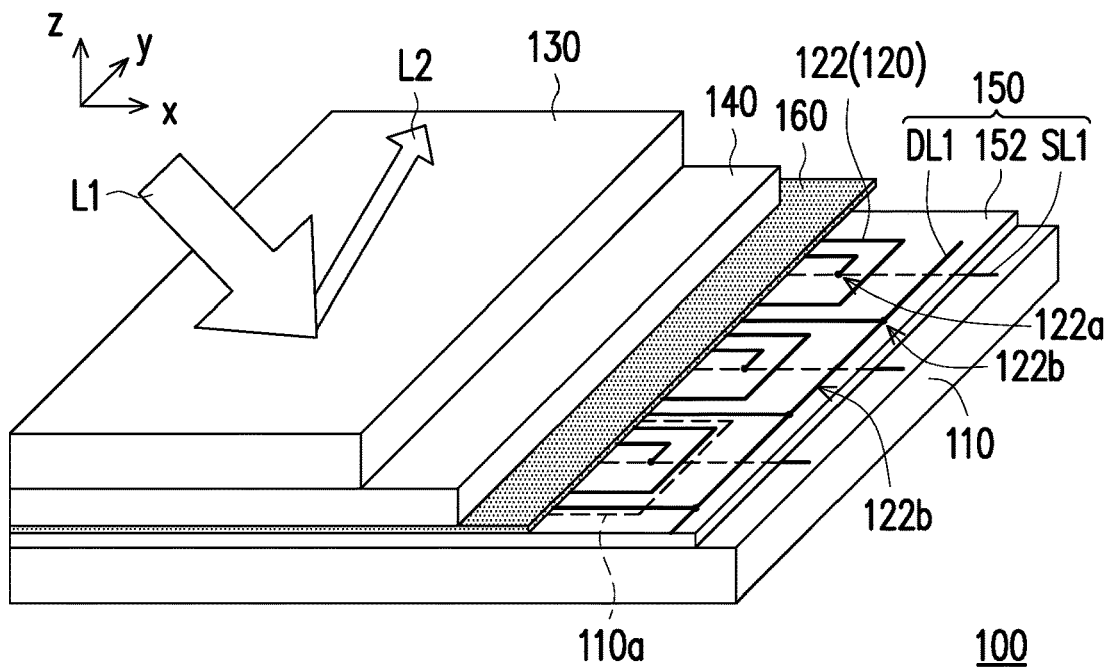
FIG. 1 is a schematic three-dimensional view of a magnetochromatic display according to an embodiment provided in the disclosure.

The invention will be described more comprehensively hereinafter with reference to the accompanying drawings, in which embodiments of the invention are shown. As those skilled in the art may realize, the described embodiments may be modified in various different ways without departing from the spirit or scope of the invention.

In the accompanying drawings, thicknesses of layers, films, panels, regions and so on are exaggerated for clarity. Throughout the specification, the same reference numerals in the accompanying drawings denote the same devices. It should be understood that when a device such as a layer, film, region or substrate is referred to as being "on" or "connected to" another device, it can be directly on or connected to another device, or intervening devices may also be present. In contrast, when a device is referred to as being "directly on" or "directly connected to" another device, there are no intervening devices present. As used herein, the term "connected" may refer to physical connection and/or electrical connection. Besides, if two devices are electrically connected, it means that other devices are between these two electrically connected devices.

The term "about," "approximately," or "substantially" as used herein is inclusive of the stated value and means within an acceptable range of deviation for the particular value as determined by people having ordinary skill in the art, considering the measurement in question and the error associated with measurement of the particular quantity (i.e., the limitations of the measurement system). For example, "about" may mean within one or more standard deviations, for example, ±30%, ±20%, ±10%, or ±5% of the stated value. Moreover, a relatively acceptable range of deviation or standard deviation may be chosen for the term "about," "approximately," or "substantially" as used herein based on optical properties, etching properties or other properties, instead of applying one standard deviation across all the properties.

Unless otherwise defined, all terms (including technical and scientific terms) used herein have the same meaning as commonly understood by people having ordinary skill in the art. It will be further understood that terms, such as those defined in commonly used dictionaries, should be interpreted as having a meaning that is consistent with their meaning in the context of the relevant art and the disclosure and will not be interpreted in an idealized or overly formal sense unless expressly so defined herein.

Exemplary embodiments are described herein with reference to schematic cross-sectional views illustrating idealized embodiments. Hence, variations of shapes resulting from manufacturing technologies and/or tolerances, for instance, are to be expected. The embodiments described herein should not be construed as being limited to the particular shapes of regions as illustrated herein but are to include deviations in shapes that result, for example, from manufacturing. For instance, regions shown or described as being flat may typically have rough and/or non-linear features. Besides, the acute angle as shown may be round. That is, the regions shown in the drawings are schematic in nature, and their shapes are not intended to show the exact shape of the regions, and are not intended to limit the scope of the claims.

Reference will now be made in detail to embodiments provided in the disclosure, examples of which are illustrated in accompanying drawings. Wherever possible, identical reference numbers are used in figures and descriptions to refer to identical or similar parts.

FIG. 1 is a schematic three-dimensional view of a magnetochromatic display according to an embodiment provided in the disclosure. With reference to FIG. 1, a magnetochromatic display 100 includes a first substrate 110, a plurality of first magnetic field modulating devices 120, a second substrate 130, and a magnetochromatic layer 140. The first substrate 110 has a plurality of first pixel regions 110a. The first magnetic field modulating devices 120 are respectively disposed on the first pixel regions 110a of the first substrate 110. The second substrate 130 is disposed opposite to the first substrate 110. The magnetochromatic layer 140 is disposed between the first substrate 110 and the second substrate 130. In the present embodiment, the material of the first substrate 110 may be a transparent or non-transparent/reflective material, and the material of the second substrate 130 is a transparent material. The transparent material is, for example, glass, quartz, organic polymer, or other suitable materials. The non-transparent/reflective material is, for example, a conductive material, a wafer, ceramic, a reflective material provided on the transparent material, or other suitable materials, which should however not be construed as limitations in the disclosure.

In the present embodiment, the first magnetic field modulating devices 120 may include coils 122 and/or other appropriate devices, for instance. The number of turns in the coils 122 may be determined according to the magnetic field required for driving the magnetochromatic layer 140 and is not limited to what is shown in the drawings. In the embodiment, the coils 122 may be formed on the first substrate 110 selectively through photolithography. For instance, the material of the coils 122 provided in this embodiment may be a metallic material, alloy, a metal nitride material, a metal oxide material, a metal oxynitride material, an organic conductive material (e.g., PEDOT/PSS), a carbon material (e.g., nano carbon tubes, graphene, graphite), or a stacked layer having the metallic material and other conductive materials. The coils 122 provided herein are two-dimensional coils, for instance, which should not be construed as a limitation in the disclosure. Besides, in the present embodiment, each turn of the coils 122 may be substantially rectangular. However, the disclosure is not limited thereto. In other embodiments, each turn of the coils 122 may have other suitable shapes, which will be illustrated in the following paragraphs with reference to other drawings.

According to the present embodiment, the magnetochromatic display 100 further includes a first driver circuit layer 150. The first driver circuit layer 150 is disposed on the first substrate 110 and electrically connected to the first magnetic field modulating devices 120. For instance, in the present embodiment, the first driver circuit layer 150 includes a plurality of first scan lines SL1 and a plurality of first data lines DL1. The first scan lines SL1 may substantially extend along a direction x, and the first data lines DL1 may substantially extend along a direction y. The directions x and y are intersected, which should however not be construed as a limitation in the disclosure. In other embodiments, the direction along which the first scan lines SL1 are arranged may be exchanged with the direction along which the first data lines DL1 are arranged. The first driver circuit layer 150 may further include an insulation layer 152 separating the first scan lines SL1 from the first data lines DL1. The insulation layer 152 may be of a single-layer structure or a multi-layer structure and may be made of an inorganic material (e.g., silicon oxide, silicon oxynitride, silicon nitride, or other suitable materials), an organic material (e.g., polyimide, a polyester-based material, a polyolefin-based material, a polymethacrylic-acid-based material, benzocyclobutene (BCB), photoresist, or other suitable materials), any other suitable material, or a combination of the aforesaid materials.

In the present embodiment, two ends 122a and 122b of the coil 122 of each of the first magnetic field modulating devices 120 may be electrically connected to a corresponding one of the first scan lines SL1 and a corresponding one of the first data lines DL1, respectively. Thereby, when appropriate signals are applied to the first scan lines SL1 and the first data lines DL1, the electric currents on the coils 122 may generate magnetic fields to drive the magnetochromatic layer 140.

Note that the configuration of the first driver circuit layer 150 depicted in FIG. 1 is merely exemplary and should not be construed as a limitation in the disclosure. In other embodiments, the configuration of the first driver circuit layer 150 may be designed in different manners, which will be exemplarily described below with reference of other drawings.

Figure 2:
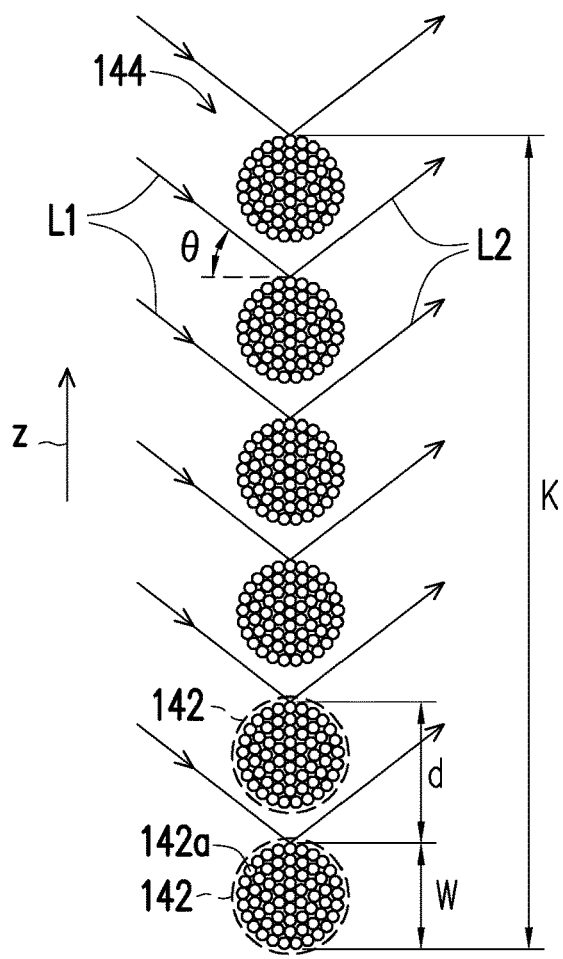
FIG. 2 illustrates a plurality of magnetic particles of a magnetochromatic layer according to an embodiment provided in the disclosure.

FIG. 2 shows a plurality of magnetic particles of a magnetochromatic layer according to an embodiment provided in the disclosure. With reference to FIG. 1 and FIG. 2, the magnetochromatic layer 140 includes a plurality of magnetic particles 142a. The magnetic particles 142a provided herein are nano-magnetic particles, for instance, which should not be construed as a limitation in the disclosure. The first magnetic field modulating devices 120 are configured to apply a magnetic field to the magnetochromatic layer 140. If the magnetic field is not applied to the magnetochromatic layer 140, the magnetic particles 142a are distributed in a solution (not shown). If the magnetic field is applied to the magnetochromatic layer 140, the distributed magnetic particles 142a are gathered to form a plurality of clusters 142. Diameters W of the clusters 142 may be controlled by adjusting a speed of an increase or decrease in the magnetic field. For instance, if the speed of the increase in the magnetic field applied to the magnetochromatic layer 140 is fast, the clusters 142 with small diameters W may be obtained; if the speed of the increase in the magnetic field applied to the magnetochromatic layer 140 is slow, the clusters 142 with large diameters W may be obtained. At this time, if the magnetic field is continuously applied to the magnetochromatic layer 140, the clusters 142 with the designated diameter W are substantially arranged along a direction z of the magnetic field generated by the first magnetic field modulating device 120 and form a cluster chain 144 with a periodic structure. The cluster chain 144 having the periodic structure is substantially arranged along the direction of the magnetic field. A period of the clusters 142 of the cluster chain 144, i.e., a distance d, is the sum of a diameter W of one cluster 142 and an interval (not shown) between two adjacent clusters 142, for instance, and the period of the clusters 142 of the cluster chain 144 is dominated by a magnetic attraction force and is also affected by a repulsive force, a solution buoyancy force, gravity, and so on. A diameter W of one cluster limits the minimum period of the clusters 142 of the cluster chain 144 (i.e., the distance d); therefore, the period of the clusters 142 of the cluster chain 144 (i.e., the distance d) is associated with the magnetic force, and d≥W.

With reference to FIG. 2, the arrangement of the clusters 142 in the cluster chain 144 is periodic. According to the Bragg's Law, when an external light beam L1 (e.g., white light) enters the cluster chain 144, a portion of the external light beam L1 is reflected and thus coherently diffracted by the cluster chain 144 having the period of the clusters, and the resulting wavelength λ of the light beam L2 after said coherent diffraction satisfies the following equation (1): $n\lambda=2d \times \sin(\theta)$, wherein n is a positive integer (unitless), and θ is an incident angle (unit: degree °). Under the action of a final saturated magnetic force, the distances d (unit: nm) among the intervals of the adjacent clusters 142 in contact with one another are substantially equal to the diameters W (unit: nm) of the clusters 142, and said equation (1) may be revised to the following equation (2): $n\lambda=2W \times \sin(\theta)$ It can be learned from the equation (2) that the resulting wavelength of the light beam L2 after the coherent diffraction by the cluster chain 144 may be controlled by adjusting the diameters W of the clusters 142 (or adjusting the speed of the increase in the magnetic field); that is, the color displayed by the first pixel regions 110a where the cluster chain 144 is located may be controlled. Besides, a length K of the cluster chain 144 may be controlled by adjusting the intensity of the magnetic field, and the range of the length K is between the nanometer and micrometer scale. The greater the length of the cluster chain 144, the more significant the amount of the light beam L2 after the coherent diffraction by the cluster chain 144. From another perspective, the brightness displayed by the first pixel regions 110a where the cluster chain 144 is located may be controlled by adjusting the intensity of the magnetic field. Through said mechanism, the color and brightness displayed by each first pixel region 110a of the magnetochromatic display 100 may be the roughly designated color and brightness, so as to display the designated image.

With reference to FIG. 1 and FIG. 2, in the present embodiment, the magnetochromatic display 100 may further include a light absorbing layer 160. The light absorbing layer 160 covers the first pixel regions 110a of the first substrate 110 and is disposed between the magnetochromatic layer 140 and the first substrate 110. For instance, in the present embodiment, the light absorbing layer 160 may be disposed between the magnetochromatic layer 140 and the first driver circuit layer 150, which should however not be construed as a limitation in the disclosure. The light absorbing layer 160 is configured to absorb the light beam L1 not diffracted by the magnetochromatic layer 140 and the light with other wavelengths that do not meet the diffraction conditions, so as to optimize the image qualities of the magnetochromatic display 100.

Figure 3:
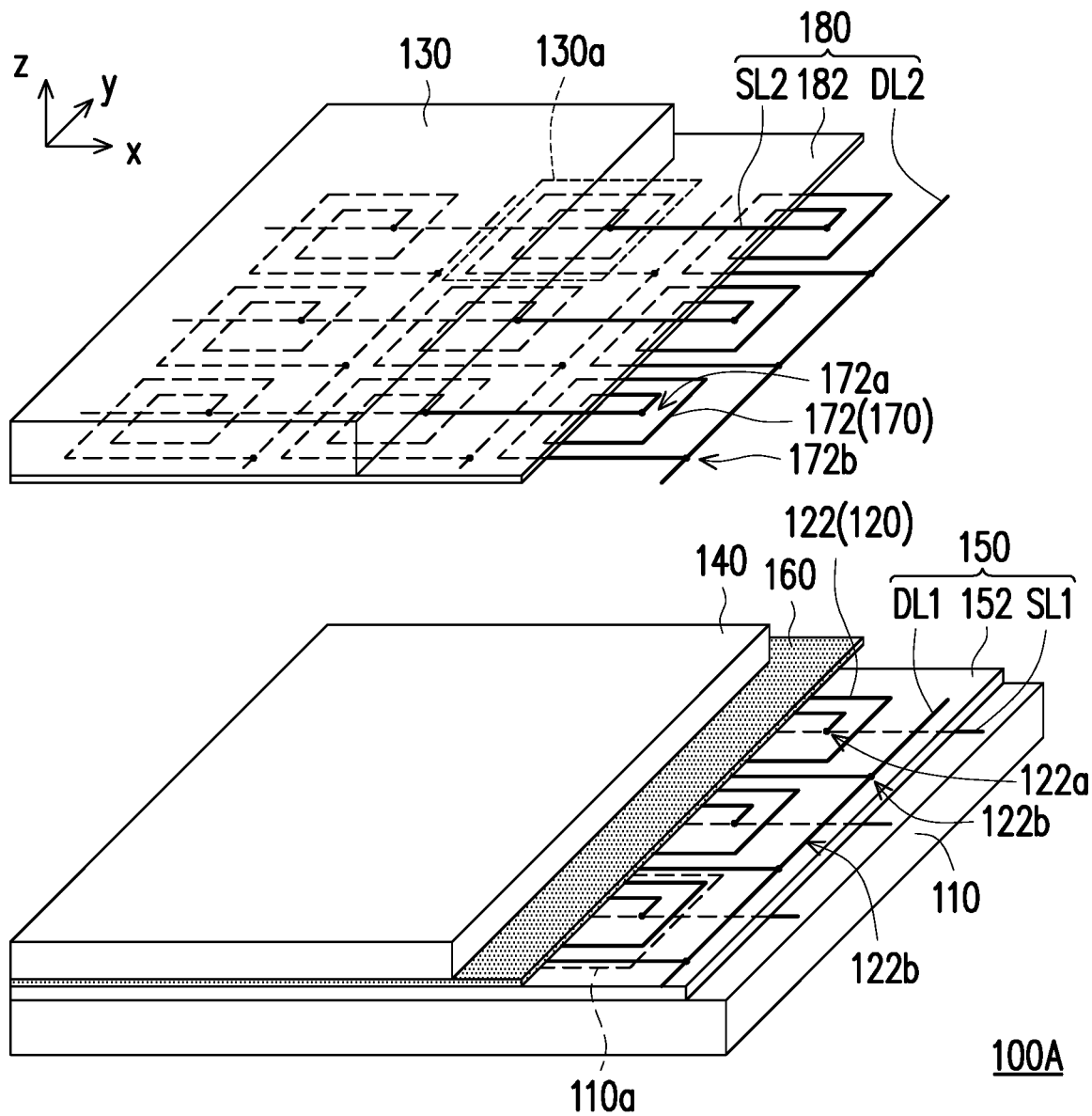
FIG. 3 is a schematic three-dimensional view of a magnetochromatic display according to another embodiment provided in the disclosure.

FIG. 3 is a schematic three-dimensional view of a magnetochromatic display according to another embodiment provided in the disclosure. The magnetochromatic display 100A depicted in FIG. 3 is similar to the magnetochromatic display 100 depicted in FIG. 1; wherever possible, identical reference numbers used in FIG. 1 and relevant descriptions are applied in FIG. 3 to refer to identical or similar parts. With reference to FIG. 1 and FIG. 3, the difference between the magnetochromatic display 100A and the magnetochromatic display 100 lies in that the magnetochromatic display 100A further includes a plurality of second magnetic field modulating devices 170 and a second driver circuit layer 180. Descriptions of other devices may be referred to as those provided above and therefore will be omitted hereinafter.

With reference to FIG. 3, in the present embodiment, the second substrate 130 has a plurality of second pixel regions 130a substantially overlapped with the first pixel regions 110a, respectively. The second magnetic field modulating devices 170 are respectively disposed on the second pixel regions 130a of the second substrate 130. The second magnetic field modulating devices 170 may include coils 172 and/or other appropriate devices, for instance. The second driver circuit layer 180 is disposed on the second substrate 130 and electrically connected to the second magnetic field modulating devices 170. For instance, the second driver circuit layer 180 includes a plurality of second scan lines SL2 and a plurality of second data lines DL2. The second scan lines SL2 may substantially extend along the direction x, and the second data lines DL2 may substantially extend along the direction y. The directions x and y are interlaced, which should however not be construed as a limitation in the disclosure. In other embodiments, the direction along which the second scan lines SL2 are arranged may be exchanged with the direction along which the second data lines DL2 are arranged. The second driver circuit layer 180 may further include an insulation layer 182 separating the second scan lines SL2 from the second data lines DL2. The insulation layer 182 may be of a single-layer structure or a multi-layer structure and may be made of an inorganic material (e.g., silicon oxide, silicon oxynitride, silicon nitride, or other suitable materials), an organic material (e.g., polyimide, a polyester-based material, a polyolefin-based material, a polymethacrylic-acid-based material, BCB, photoresist, or other suitable materials), any other suitable material, or a combination of the aforesaid materials. The material of the insulation layer 152 may be substantially identical to or different from the material of the insulation layer 182. In the present embodiment, two ends 172a and 172b of the coil 172 of each of the second magnetic field modulating devices 170 may be electrically connected to a corresponding one of the second scan lines SL2 and a corresponding one of the second data lines DL2, respectively. Thereby, when appropriate signals are applied to the second scan lines SL2 and the second data lines DL2, the electric currents on the coils 172 may generate magnetic fields to drive the magnetochromatic layer 140.

When the electric currents flow through the first magnetic field modulating devices 120 and the second magnetic field modulating devices 170, the vector of the magnetic field in the direction z on the magnetochromatic layer 140 increases, so as to improve the performance of the magnetochromatic display 100. In the present embodiment, to prevent the coils 172 from affecting the display quality (e.g., the brightness) of the magnetochromatic display 100, the coils 172 may be selectively made of transparent or at least semi-transmissive materials, e.g., indium tin oxide, indium oxide, zinc oxide, indium gallium oxide, indium gallium zinc oxide, carbon nanotubes/rods, perovskite ($ABO_3$), other suitable materials, or a combination or stack of at least two of the aforesaid materials), which should however not be construed as a limitation in the disclosure.

Figure 4:
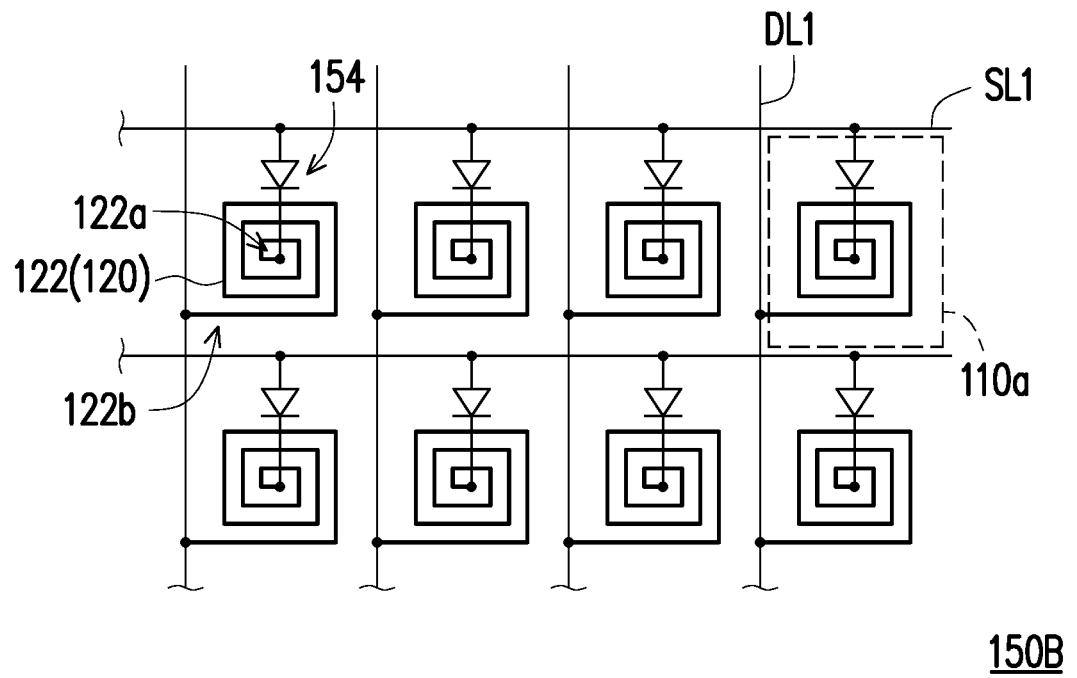
FIG. 4 is a schematic diagram of a first driver circuit layer of a magnetochromatic display according to still another embodiment provided in the disclosure.

FIG. 4 is a schematic diagram of a first driver circuit layer of a magnetochromatic display according to still another embodiment provided in the disclosure. With reference to FIG. 1 and FIG. 4, the first driver circuit layer 150B depicted in FIG. 4 is similar to the first driver circuit layer 150 depicted in FIG. 1, while the difference therebetween lies in that the first driver circuit layer 150B further includes a plurality of diodes 154. Descriptions of other devices may be referred to as those provided above and therefore will be omitted hereinafter. As shown in FIG. 4, each of the diodes 154 is electrically connected between one end 122a of the coil 122 of one of the first magnetic field modulating devices 120 and a corresponding one of the first scan lines SL1. The first scan lines SL1 are electrically connected to scan line driving units (not shown). The first data lines DL1 are electrically connected to data line driving units (not shown). The scan line driving units may sequentially provide a voltage Vs to the first scan lines SL1, and the data line driving units may adjust a voltage Vd of each of the first data lines DL1 according to the magnetic field of each of the first pixel regions 110a. Thereby, the electric current generated by the voltage difference (Vs−Vd) may be transformed into the magnetic field with the corresponding intensity by the coil 122 of each of the first pixel regions 110a, so as to adjust the color and/or the brightness of each of the first pixel regions 110a. The first driver circuit layer 150B may replace the first driver circuit layer 150 of the aforesaid magnetochromatic display 100 and/or the aforesaid magnetochromatic display 100A, and the resultant magnetochromatic display also falls within the scope of protection provided in the disclosure.

Figure 5:
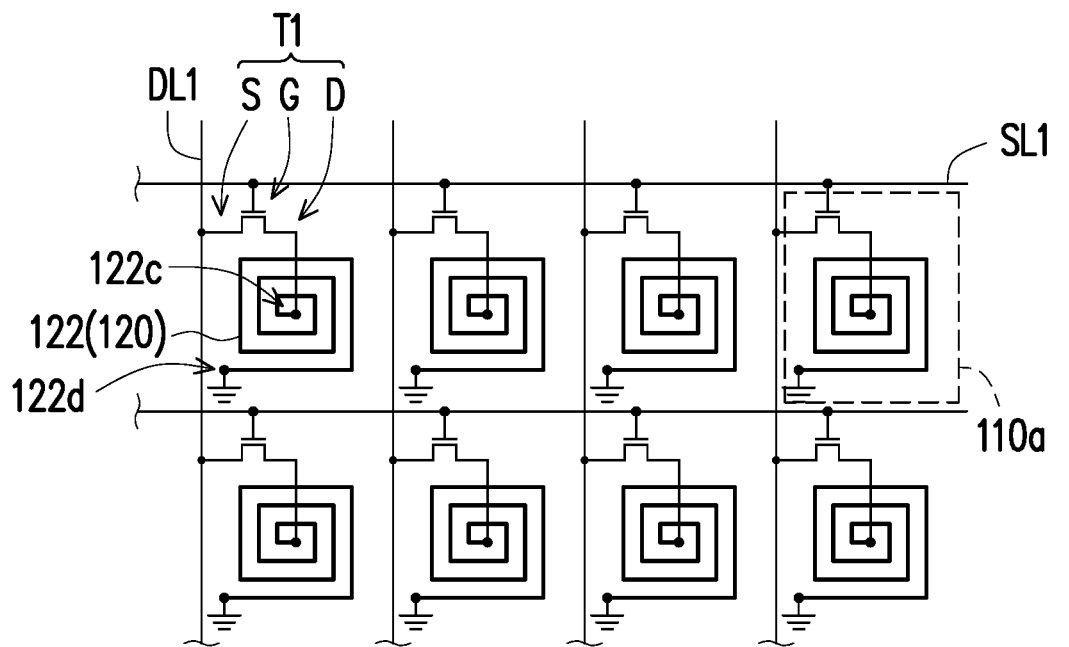
FIG. 5 is a schematic diagram of a first driver circuit layer of a magnetochromatic display according to still another embodiment provided in the disclosure.

FIG. 5 is a schematic diagram of a first driver circuit layer of a magnetochromatic display according to still another embodiment provided in the disclosure. With reference to FIG. 1 and FIG. 5, the first driver circuit layer 150C depicted in FIG. 5 is similar to the first driver circuit layer 150 depicted in FIG. 1, while the difference therebetween lies in that the first driver circuit layer 150C further includes a plurality of first thin film transistors T1. Descriptions of other devices may be referred to as those provided above and therefore will be omitted hereinafter. The first thin film transistors T1 are respectively disposed on the first pixel regions 110a and electrically connected to the first magnetic field modulating devices 120. For instance, each of the first thin film transistors T1 has a source S electrically connected to the corresponding first data line DL1, a gate G electrically connected to the corresponding first scan line SL, and a drain D electrically connected to an end 122c of the coil of the corresponding first magnetic field modulating device 120, while the other end 122d of the coil 122 of the corresponding first magnetic field modulating device 120 may be grounded, which should however not be construed as limitations in the disclosure.

With reference to FIG. 5, the first scan lines SL are electrically connected to scan line driving units (not shown). The first data lines DL1 are electrically connected to data line driving units (not shown). The scan line driving units may sequentially turn on the first thin film transistors T1 arranged in rows, such that the voltage Vd provided by the data line driving units may be transmitted to the coil 122 of each first pixel region 110a through each of the first data lines DL1. Since the electric current generated by the voltage difference between the two ends 122c and 122d of the coil may be transformed into the magnetic field with the corresponding intensity, the color and/or the brightness of each of the first pixel regions 110a may accordingly be adjusted. The first driver circuit layer 150C may replace the first driver circuit layer 150 of the aforesaid magnetochromatic display 100 and/or the aforesaid magnetochromatic display 100A, and the resultant magnetochromatic display also falls within the scope of protection provided in the disclosure.

Figure 6:
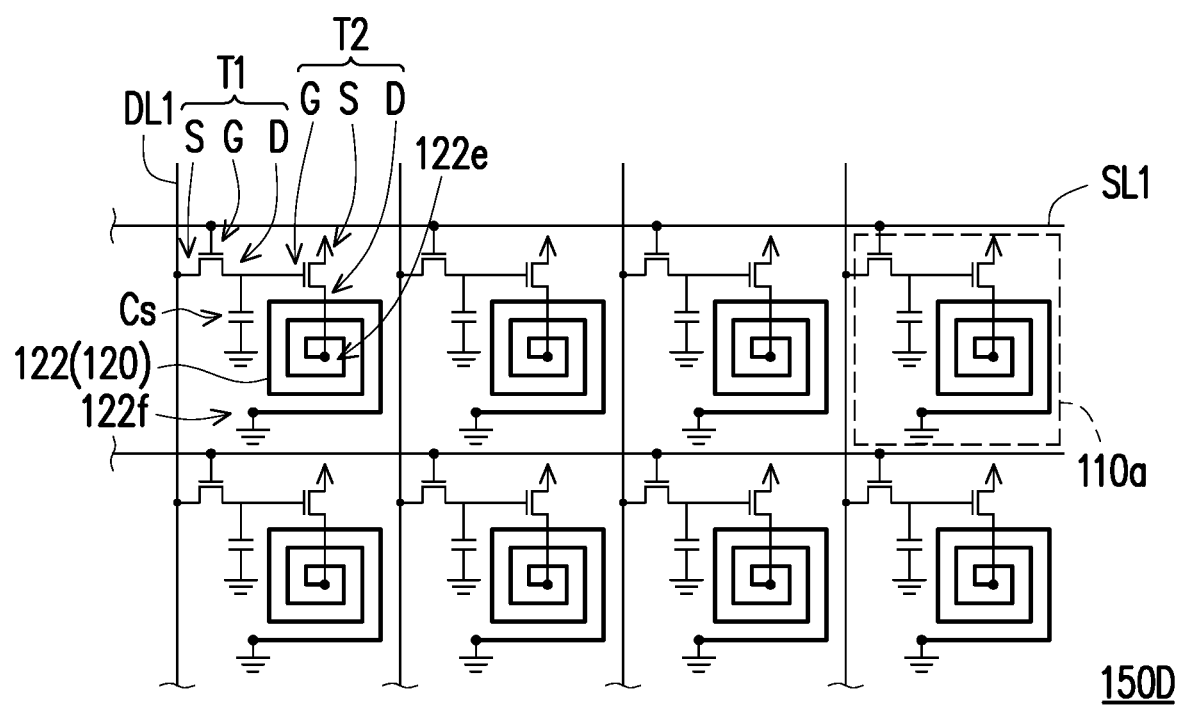
FIG. 6 is a schematic diagram of a first driver circuit layer of a magnetochromatic display according to an embodiment provided in the disclosure.

FIG. 6 is a schematic diagram of a first driver circuit layer of a magnetochromatic display according to an embodiment provided in the disclosure. With reference to FIG. 1 and FIG. 6, the first driver circuit layer 150D depicted in FIG. 6 is similar to the first driver circuit layer 150 depicted in FIG. 1, while the difference therebetween lies in that the first driver circuit layer 150D further includes a plurality of first thin film transistors T1, a plurality of second thin film transistors T2, and a plurality of thin film capacitors Cs. Descriptions of other devices may be referred to as those provided above and therefore will be omitted hereinafter.

With reference to FIG. 6, the first thin film transistors T1 are respectively disposed on the first pixel regions 110a and electrically connected to the first magnetic field modulating devices 120. For instance, each of the first thin film transistors T1 has a source S electrically connected to the corresponding first data line DL1, a gate G electrically connected to the corresponding first scan line SL, and a drain D electrically connected to the corresponding thin film capacitor Cs and the corresponding second thin film transistor T2. Each of the second thin film transistors T2 has a source S, a gate G, and a drain D. Here, the source S of the second thin film transistor T2 has a reference potential, and the gate G of the second thin film transistor T2 is electrically connected to the drain D of the corresponding first thin film transistor T1. One end of the thin film capacitor Cs is electrically connected to the drain D of the corresponding first thin film transistor T1, and the other end of the thin film capacitor Cs may be grounded. In the present embodiment, one end 122e of the coil 122 of each first magnetic field modulating device 120 may be electrically connected to the drain D of each second thin film transistor T2, and the other end 122f of the coil 122 may be grounded. When the voltage Vs is supplied to the first thin film transistor T1, the first thin film transistor T1 is turned on. At this time, the voltage Vd provided by the first data line DL1 is transmitted to the thin film capacitor Cs to charge the thin film capacitor Cs. The second thin film transistor determines, by means of the thin film capacitor Cs, the amount of electric current to be supplied to the coil 122 of each first magnetic field modulating device 120. The electric current on the coil 122 may be transformed into the magnetic field with the corresponding intensity, so as to adjust the color and/or the brightness of each of the first pixel regions 110a. The first driver circuit layer 150D may replace the first driver circuit layer 150 of the aforesaid magnetochromatic display 100 and/or the aforesaid magnetochromatic display 100A, and the resultant magnetochromatic display also falls within the scope of protection provided in the disclosure.

Figure 7:
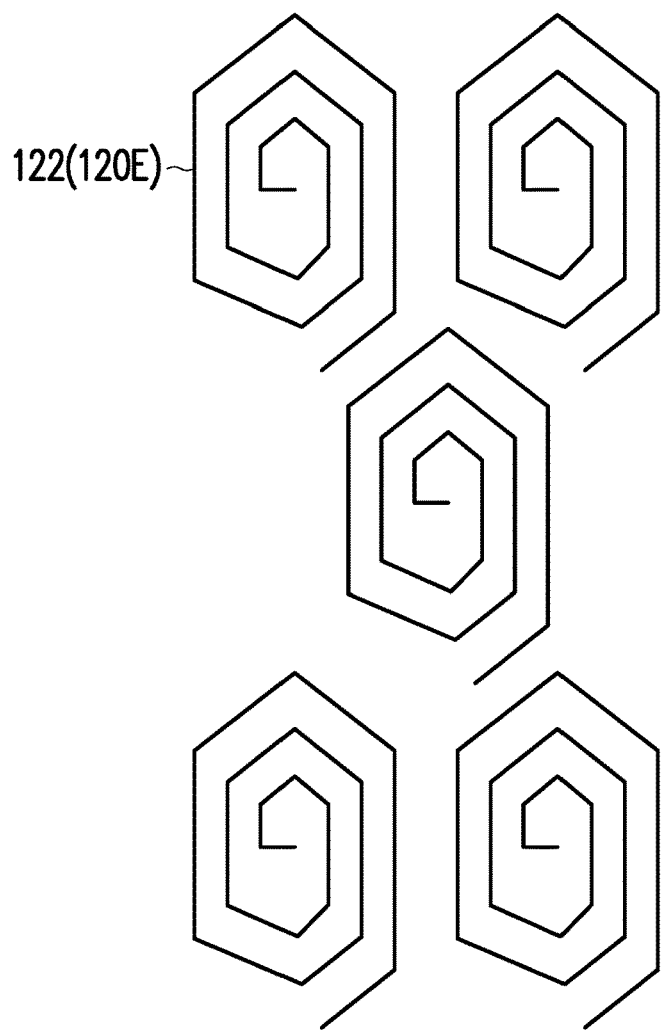
FIG. 7 is a schematic view of coils of first magnetic field modulating devices according to another embodiment provided in the disclosure.
Figure 8:
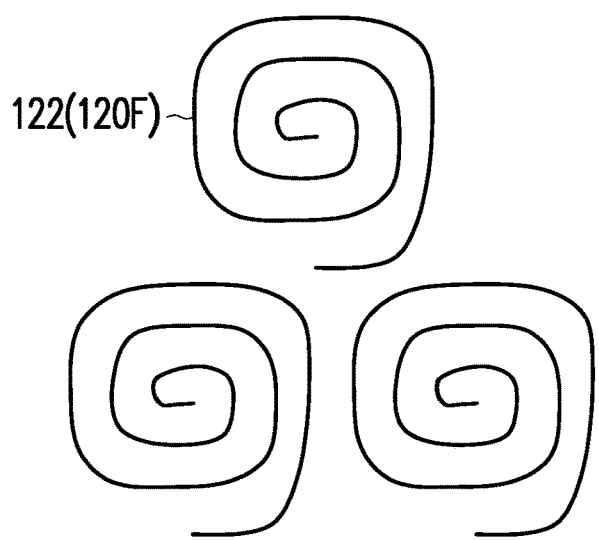
FIG. 8 is a schematic view of coils of first magnetic field modulating devices according to still another embodiment provided in the disclosure.

FIG. 7 is a schematic view of coils of first magnetic field modulating devices according to another embodiment provided in the disclosure. According to the embodiment depicted in FIG. 7, each turn of the coil 122 in each first magnetic field modulating device 120E may be polygonal, which may be (but is not limited to) a hexagon. FIG. 8 is a schematic view of coils of first magnetic field modulating devices according to still another embodiment provided in the disclosure. According to the embodiment depicted in FIG. 8, each turn of the coil 122 in each first magnetic field modulating device 120F may be circular or quasi-circular. However, this should not be construed as a limitation in the disclosure; in other embodiments, the coil 122 in each first magnetic field modulating device 120 may be designed to have another appropriate shape, e.g., triangular, elliptical, and so on. The first magnetic field modulating devices 120E, the first magnetic field modulating devices 120F, or the first magnetic field modulating devices with other shapes may replace the first magnetic field modulating devices 120 of the aforesaid magnetochromatic display 100 and/or the aforesaid magnetochromatic display 100A, and the resultant magnetochromatic display also falls within the scope of protection provided in the disclosure.

Figure 9:
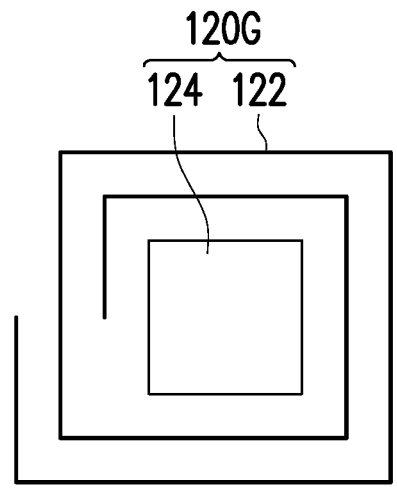
FIG. 9 is a schematic view of first magnetic field modulating devices according to another embodiment provided in the disclosure.
Figure 10:
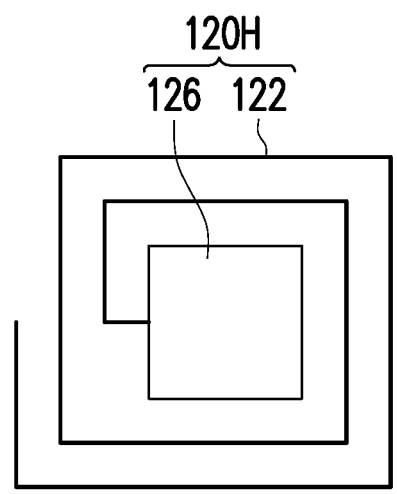
FIG. 10 is a schematic view of first magnetic field modulating devices according to still another embodiment provided in the disclosure.

FIG. 9 is a schematic view of first magnetic field modulating devices according to another embodiment provided in the disclosure. The first magnetic field modulating devices 120G shown in FIG. 9 not only include the coils 122 but also include magnetic core materials 124. The coils 122 are configured to generate the magnetic fields, and the magnetic core materials 124 are respectively arranged within the magnetic fields. In an embodiment, the magnetic core materials 124 are preferably soft magnetic materials, which should not be construed as a limitation in the disclosure. The soft magnetic materials have high permeability and thus can be well gathered to increase the magnetic flux density, so as to reduce the voltage/current required for driving the first magnetic field modulating devices 120G In the embodiment shown in FIG. 9, the magnetic core materials 124 may selectively be electrically isolated from the coils 122 or separated from the coils 122. However, this should not be construed as a limitation in the disclosure. FIG. 10 is a schematic view of first magnetic field modulating devices according to still another embodiment provided in the disclosure. In the embodiment shown in FIG. 10, the magnetic core materials 126 of the first magnetic field modulating devices 120H may be selectively electrically connected to the coils 122. Particularly, the magnetic core materials 126 may be electrically connected between the coils 122 and the first driver circuit layer 150 (shown in FIG. 1) and serve as the conductive path between the coils 122 and the first driver circuit layer 150.

The first magnetic field modulating devices 120G and/or the first magnetic field modulating devices 120H may serve to replace the first magnetic field modulating devices 120 of any of the aforesaid magnetochromatic display 100 and the aforesaid magnetochromatic display 100A, and the resultant magnetochromatic display still falls within the scope of protection provided in the disclosure.

Figure 11:
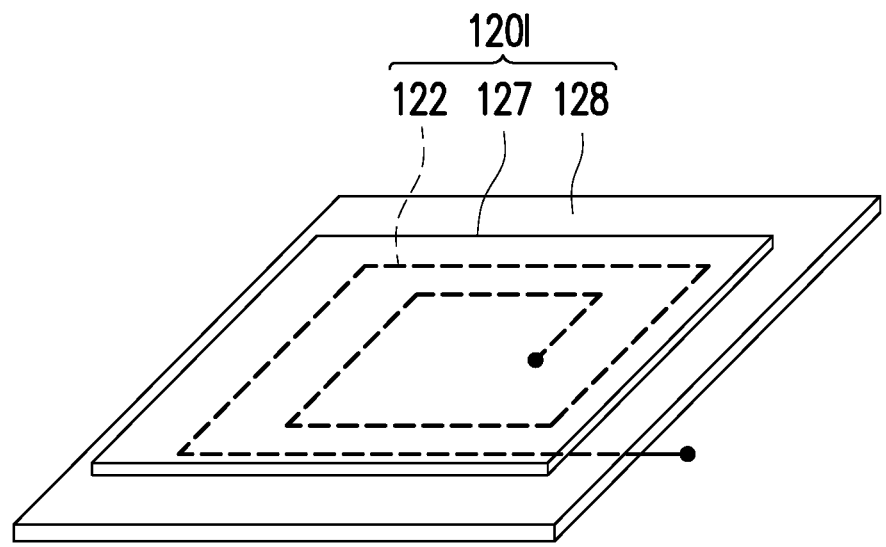
FIG. 11 is a schematic view of coils of first magnetic field modulating devices according to still another embodiment provided in the disclosure.

FIG. 11 is a schematic view of coils of first magnetic field modulating devices according to still another embodiment provided in the disclosure. The first magnetic field modulating devices 120I shown in FIG. 11 also include the coils 122 and the magnetic storage materials 127. The difference lies in that the first magnetic field modulating devices 120I further includes an insulation layer 128. The insulation layer 128 covers the coils 122. The magnetic storage materials 127 are disposed on the insulation layer 128 and overlapped with the coils 122. The insulation layer 128 may be of a single-layer structure or a multi-layer structure and may be made of an inorganic material (e.g., silicon oxide, silicon oxynitride, silicon nitride, or other suitable materials), an organic material (e.g., polyimide, a polyester-based material, a polyolefin-based material, a polymethacrylic-acid-based material, BCB, photoresist, or other suitable materials), any other suitable material, or a combination of the aforesaid materials. The material of at least one of the insulation layer 128, the insulation layer 152, and the insulation layer 182 may be substantially identical or different. In the present embodiment, the magnetic storage materials 127 may cover the entire area occupied by the coils 122. The magnetic storage materials 127 of the first magnetic field modulating devices 120I not only memorize the intensity of the magnetic field and increase the magnetic flux density but also bring the magnetic field distribution into uniformity. In the embodiment shown in FIG. 11, the coils 122 may be selectively disposed below the insulation layer 128 and may be located between the insulation layer 128 and the first driver circuit layer 150 (shown in FIG. 1). However, this should not be construed as a limitation in the disclosure.

Figure 12:
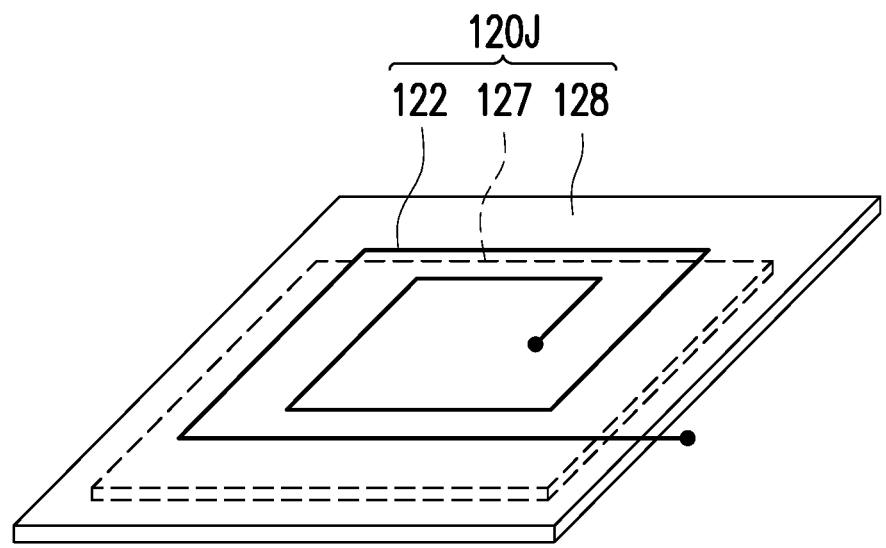
FIG. 12 is a schematic view of first magnetic field modulating devices according to an embodiment provided in the disclosure.

FIG. 12 is a schematic view of first magnetic field modulating devices according to an embodiment provided in the disclosure. In the embodiment shown in FIG. 12, the coils 122 of the first magnetic field modulating devices 120J may be selectively disposed on the insulation layer 128, and the magnetic storage materials 127 of the first magnetic field modulating devices 120J may be located between the insulation layer 128 and the first driver circuit layer 150 (shown in FIG. 1).

The first magnetic field modulating devices 120I and/or the first magnetic field modulating devices 120J may serve to replace the first magnetic field modulating devices 120 of any of the aforesaid magnetochromatic display 100 and the aforesaid magnetochromatic display 100A, and the resultant magnetochromatic display still falls within the scope of protection provided in the disclosure. The magnetic storage materials 127 may memorize the intensity of the magnetic field formed by the coils 122, so as to stabilize the color display of the magnetochromatic display 100 and achieve bistable display effects (e.g., static display with less power consumption).

Besides, according to the previous embodiments, a semiconductor layer (not shown) of at least one of the first and second thin film transistors T1 and T2 may be of a single-layer structure or a multi-layer structure, and the material of the semiconductor layer includes amorphous silicon, microcrystalline silicon, nanocrystalline silicon, polysilicon, monocrystalline silicon, carbon nanotubes/rods, an oxide semiconductor, an organic semiconductor, perovskite ($ABO_3$), or any other appropriate material.

To sum up, the magnetochromatic display provided in one or more embodiments is characterized by high reflectivity and can achieve great image qualities.

It will be apparent to those skilled in the art that various modifications and variations can be made to the structure described in the disclosure without departing from the scope or spirit of the disclosure. In view of the foregoing, it is intended that the disclosure cover modifications and variations provided they fall within the scope of the following claims and their equivalents.

What is claimed is:
1. A magnetochromatic display, comprising:
  a first substrate, having a plurality of first pixel regions;
  a plurality of first magnetic field modulating devices, respectively disposed on the plurality of first pixel regions;
  a second substrate, disposed opposite to the first substrate, wherein the second substrate has a of second pixel regions respectively overlapped with the plurality of first pixel regions;
  a magnetochromatic layer, disposed between the first substrate and the second substrate; and a plurality of second magnetic field modulating devices, respectively disposed on the plurality of second pixel regions of the second substrate.

2. The magnetochromatic display according to claim 1, further comprising:
a first driver circuit layer, disposed on the first substrate and electrically connected to the plurality of first magnetic field modulating devices.

3. The magnetochromatic display according to claim 2, wherein the first driver circuit layer comprises:
a plurality of first thin film transistors, respectively disposed on the plurality of first pixel regions of the first substrate and electrically connected to the plurality of first magnetic field modulating devices; and
a plurality of first scan lines and a plurality of first data lines disposed on the first substrate, the plurality of first scan lines and the plurality of first data lines being intersected to each other and electrically connected to the plurality of first thin film transistors, respectively.

4. The magnetochromatic display according to claim 3, wherein the first driver circuit layer further comprises a plurality of first thin film capacitors disposed on the first substrate and electrically connected to the plurality of first thin film transistors, respectively.

5. The magnetochromatic display according to claim 1, wherein the plurality of first magnetic field modulating devices comprises a plurality of coils disposed on the first substrate.

6. The magnetochromatic display according to claim 5, wherein the plurality of first magnetic field modulating devices further comprises a plurality of magnetic core materials, the plurality of coils respectively generate a plurality of magnetic fields, and the plurality of magnetic core materials are respectively disposed within the plurality of magnetic fields.

7. The magnetochromatic display as recited in claim 6, further comprising:
a first driver circuit layer disposed on the first substrate and electrically connected to the plurality of coils through the plurality of magnetic core materials.

8. The magnetochromatic display according to claim 5, wherein the plurality of first magnetic field modulating devices further comprises:
a plurality of magnetic storage materials, the plurality of magnetic storage materials and the plurality of coils being at least partially overlapped; and
an insulation layer, disposed between the plurality of magnetic storage materials and the plurality of coils.

9. The magnetochromatic display according to claim 1, further comprising:
a second driver circuit layer, disposed on the second substrate and electrically connected to the plurality of second magnetic field modulating devices.

10. The magnetochromatic display according to claim 9, wherein the second driver circuit layer comprises:
a plurality of second thin film transistors, respectively disposed on the plurality of second pixel regions of the second substrate and electrically connected to the plurality of second magnetic field modulating devices; and
a plurality of second scan lines and a plurality of second data lines disposed on the second substrate, the plurality of second scan lines and the plurality of second data lines being intersected to each other, and electrically connected to the plurality of second thin film transistors, respectively.

11. The magnetochromatic display according to claim 1, wherein the plurality of second magnetic field modulating devices comprises a plurality of coils and the plurality of coils are transparent or se transmissive.

12. The magnetochromatic display as recited in claim 1, further comprising:
a light absorbing layer, disposed between the magnetochromatic layer and the first substrate.

13. A driving method for driving a magnetochromatic display, the magnetochromatic display comprising a first substrate having a plurality of first pixel regions, a plurality of first magnetic field modulating devices respectively disposed on the plurality of first pixel regions, a second substrate disposed opposite to the first substrate, a magnetochromatic layer disposed between the first substrate and the second substrate and a plurality of second magnetic field modulating, wherein the magnetochromatic layer has a plurality of magnetic particles located on any of the plurality of first pixel regions, the second substrate has a plurality of second pixel regions respectively overlapped with the plurality of first pixel regions, and the plurality of second magnetic field modulating devices are respectively disposed on the plurality of second pixel regions of the second substrate, the driving method comprising:
generating a magnetic field by one of the plurality of first magnetic field modulating devices on the any of the plurality of first pixel regions, so that the plurality of magnetic particles are arranged in form of a cluster chain along a direction of the magnetic field, the cluster chain comprising a plurality of clusters, each of the plurality of clusters comprising the plurality of magnetic particles gathering together; and
controlling a period of the plurality of periodically arranged clusters of the cluster chain through adjusting a speed of an increase or decrease in the magnetic field and an intensity of the magnetic field, so as to control diffraction wavelength in and brightness shown by the plurality of first pixel regions.

14. The driving method according to claim 13, further comprising: controlling a length of the cluster chain through the intensity of the magnetic field, so as to determine the brightness displayed by the any of the plurality of first pixel regions.

* * * * *